May 31, 1960  J. F. CLARKE  2,938,339
FUEL CONTROL APPARATUS
Filed Dec. 18, 1956  3 Sheets-Sheet 1

INVENTOR.
JAMES F. CLARKE.
BY
ATTORNEY.

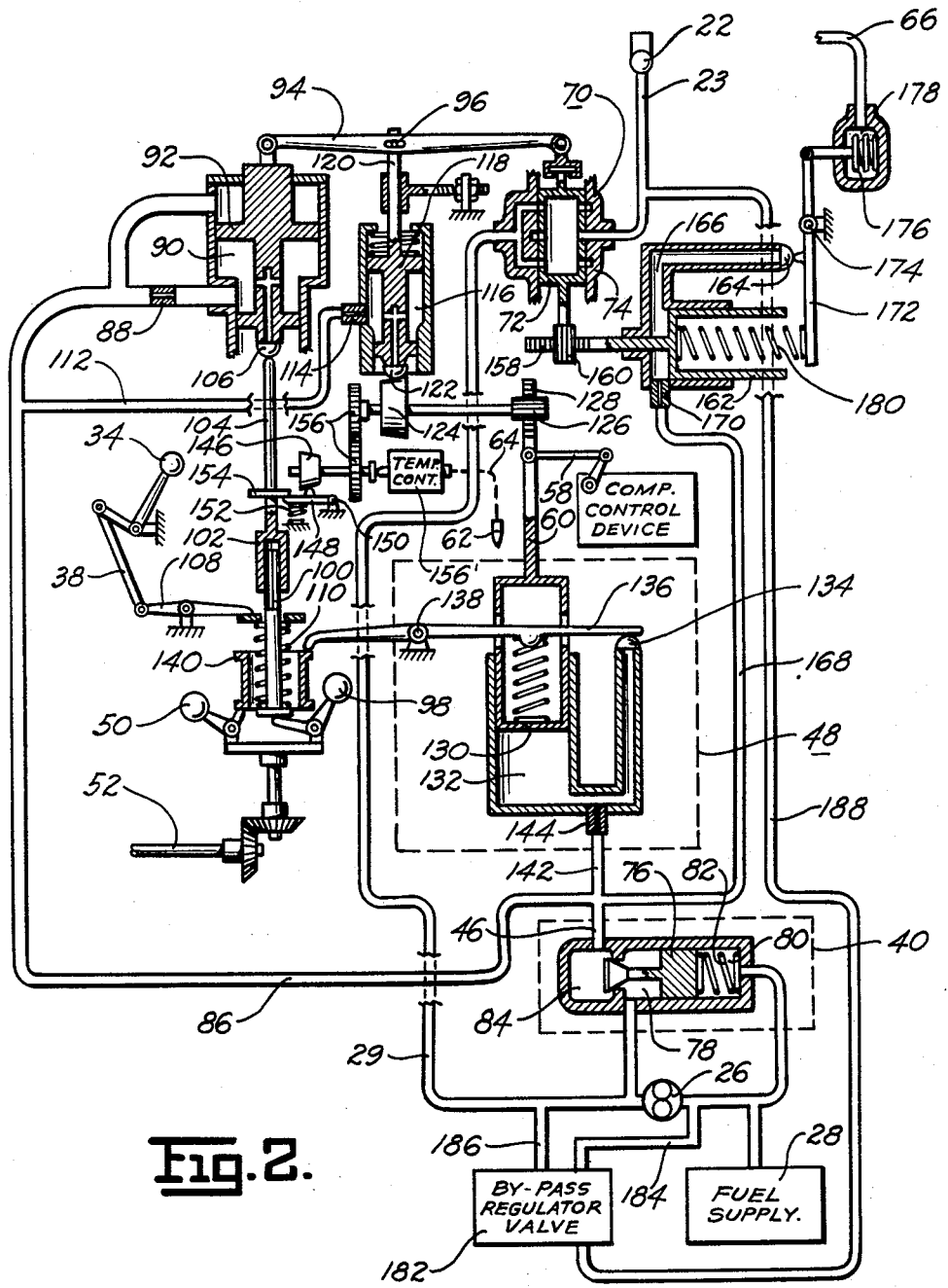

May 31, 1960 J. F. CLARKE 2,938,339
FUEL CONTROL APPARATUS

Filed Dec. 18, 1956 3 Sheets-Sheet 3

INVENTOR.
JAMES F. CLARKE.
BY
ATTORNEY

United States Patent Office 2,938,339
Patented May 31, 1960

2,938,339

FUEL CONTROL APPARATUS

James F. Clarke, South Bend, Ind., assignor to Bendix Aviation Corporation, South Bend, Ind., a corporation of Delaware Filed Dec. 18, 1956, Ser. No. 629,052

7 Claims. (Cl. 60—39.27)

The present invention relates in general to fuel control apparatus, and more particularly to fuel control apparatus for an engine such as an internal combustion engine or the like.

In the operation of an internal combustion engine such as a gas turbine engine having an axial compressor, it may be desirable under certain operating conditions to modify the operation of that engine such that an attendant change in the fuel flow schedule to the engine may also be desirable. More specifically, it may become desirable to enrichen or derichen the fuel flow schedule during some particular condition of engine operation, such as during an acceleration of that engine. With an axial compressor having interstage bleed control members, this change in the fuel flow schedule may be desirable when those bleed control members are in operation.

Accordingly, it is an object of the present invention to provide an improved control apparatus for an engine such as a gas turbine or like internal combustion engine.

It is a further object of the present invention to provide an improved control apparatus for an engine, which apparatus is operative in an improved manner to vary the fuel flow to said engine as a function of a predetermined engine operating parameter or condition.

It is another object of the present invention to provide improved fuel flow control apparatus for an engine, to provide a better scheduling of the fuel flow to the engine during acceleration of the engine.

It is a different object of the present invention to provide an improved fuel control apparatus for an engine including a compressor subject to stall operation and provided with stall operation control members, wherein as the stall characteristic is varied by said control members the fuel flow to the engine is also varied to provide a better and more efficient operation of the engine.

It is an additional object of the present invention to provide an improved fuel control apparatus for an engine including an axial compressor having a stall or unstable operating region, which fuel control apparatus is operative to provide a better and more desirable acceleration fuel flow scheduling to the engine relative to the operation of said compressor.

These and other objects and advantages of the present invention will become apparent in view of the following description taken in conjunction with the drawings wherein:

Figure 2 is a schematic showing of the control apparatus in accordance with the present invention;

Figure 1:
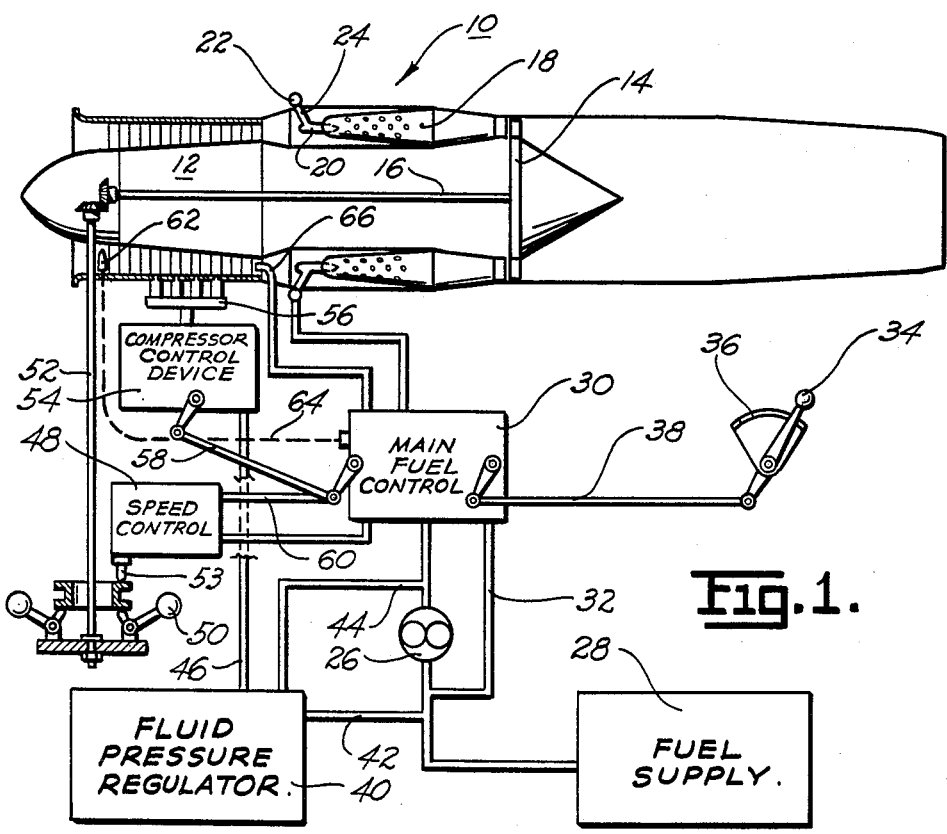
Figure 1 is a diagrammatic showing of engine control apparatus in accordance with the present invention.

In Figure 1 there is shown an internal combustion engine 10, such as a gas turbine engine, including a compressor 12 and a turbine 14 interconnected by a drive shaft 16. A plurality of combustion chambers 18 are provided, with each including a fuel nozzle 20 connected to a fuel manifold 22 through individual fuel conduits 24. Fuel is supplied by a fuel pump 26 from a fuel supply 28 to a main fuel control 30. A by-pass conduit 32 is provided as well known by persons skilled in this art. The control throttle member 34 is provided with a control quadrant 36, and is operative through a connecting arm 38 to control the operation of the main fuel control 30. A fluid pressure regulator 40 receives fuel at pump inlet pressure through a conduit 42 and at pump outlet pressure through a conduit 44, and supplies pressure regulated control fluid through a conduit 46 to a speed control 48 and the main fuel control 30. An engine speed responsive flyweight member 50 is connected through a connecting shaft 52 and suitable gearing as shown to the compressor 12, and is operative to apply a speed responsive control force to the speed control 48 through the connecting member 53. A compressor control device 54 is operative with a control member 56 for controlling the operation of the compressor 12 by bleeding predetermined stages of the compressor 12. The compressor control device 54 is controlled through a connecting arm 58 from the output member 60 of the speed control 48. In this respect it should be understood that the compressor control device 54 is illustrative of one or more compressor bleed control members as well known to persons skilled in this art. A temperature responsive member 62 may be positioned at the inlet to the compressor 12, and connected through a suitable connection 64 to the main fuel control 30. A compressor discharge pressure sensing element 66 may be provided and connected to the main fuel control 30 as shown.

In Figure 2 there is shown the fuel pump 26 operative to supply fuel from the fuel supply 28 through a conduit 29 to the fuel metering valve 70 including a movable valve member 72 and a cooperating outer sleeve member 74. Fuel from the metering valve 70 is supplied to the fuel manifold 22 through an output conduit 23. The fluid pressure regulator 40 is shown including a movable valve member 76 positioned between a first fluid chamber 78 containing fluid at pump output pressure and a second fluid chamber 80 including a control spring member 82 and containing fluid at pump inlet pressure. The movement of the control piston member 76 determines the regulated fluid pressure within the fluid chamber 84 which is connected through a conduit 86 including a control bleed member 88 to a fluid chamber 90 operative with a control piston member 92. The latter piston member 92 is connected through a pivoted control arm 94 as shown to determine the axial position of the movable valve member 72 of the fuel metering valve 70. The control arm 94 is pivoted about the support connection 96 in this respect.

A second speed responsive flyweight member 98 may be operative to apply a control force as a function of engine speed to axially position the control shaft 100 and through an axially extendable connection or joint 102 to position a second control shaft 104, which is operative to control the position of a half-ball or flapper valve member 106 for the purpose of controlling the pressure of the control fluid within the chamber 90 and thereby to control the position of the piston member 92 as a function of engine speed. In this respect the manual control throttle member 34 is operative through the connecting arm 38 as shown to position one end of a control link member 108 which applies a force to one end of a governor spring 110 for the purpose of controlling the position of the control shaft 100 as a further function of manual control throttle position.

The regulated fluid pressure from the chamber 84 is supplied through the conduit 86 to an additional conduit 112 which contains a control bleed member 114 and supplies control fluid to a chamber 116 operative with a control piston 118 to determine through a control shaft 120 the position of the fulcrum or pivot connection 96 for the control arm 94. The control fluid pressure within the chamber 116 is controlled by a half-ball or flapper valve member 122 by a control cam 124 which is positioned by a pinion 126 and rack member 128 by means of a control piston member 130 operative with a fluid chamber 132 containing control fluid at a pressure controlled by a half-ball or flapper valve 134. The latter half-ball valve 134 is positioned by a control arm 136 pivoted about connection 138 by a control member 140 operative with the speed responsive weight member 50. The position of the control piston 130 is thereby controlled as a function of engine speed. Control fluid is supplied to the chamber 132 through a conduit 142 including a bleed member 144 from the regulated fluid pressure chamber 84 of the fluid pressure regulator 40.

An engine acceleration fuel flow scheduling cam 146 is provided and is operative through a control arm 148 pivoted about support connection 150 and operative with a control spring 152 to determine the axial position of the control shaft 104 through a collar 154. The acceleration fuel scheduling cam 146 is rotated and positioned through a gear arrangement 156 as determined by the position of the control piston 130. If desired the engine operating temperature responsive element 62 may be connected through connection 64 to a temperature control 156' which determines the axial position of the acceleration fuel flow scheduling cam member 146.

The valve member 72 of the fuel metering valve 70 is rotated through a rack 158 and pinion 160 by means of a control piston 162 which is positioned by a half-ball or flapper valve member 164 operative with a fluid chamber 166. The latter fluid chamber 166 receives control fluid through a conduit 168 including a control bleed member 170 and connected to the regulated pressure fluid chamber 84. The position of the half-ball valve 164 is controlled by a control arm 172 pivoted about support connection 174 by means of an expansible bellows member 176 provided within a pressure chamber 178 connected to the compressor operating pressure responsive element 66 shown in Figure 1. A feed-back spring 180 is connected between the control piston 162 and the control arm 172.

A conventional by-pass or head regulator valve 182 may be provided and responsive to the pump inlet fuel pressure through a conduit 184 and responsive to the pump outlet fuel pressure through a conduit 186 and responsive to the pressure of the fuel within the fuel manifold 22 through a conduit 188 for the purpose of regulating the pressure of the fuel within the conduit 29 as well known to persons skilled in this art.

Figure 3:
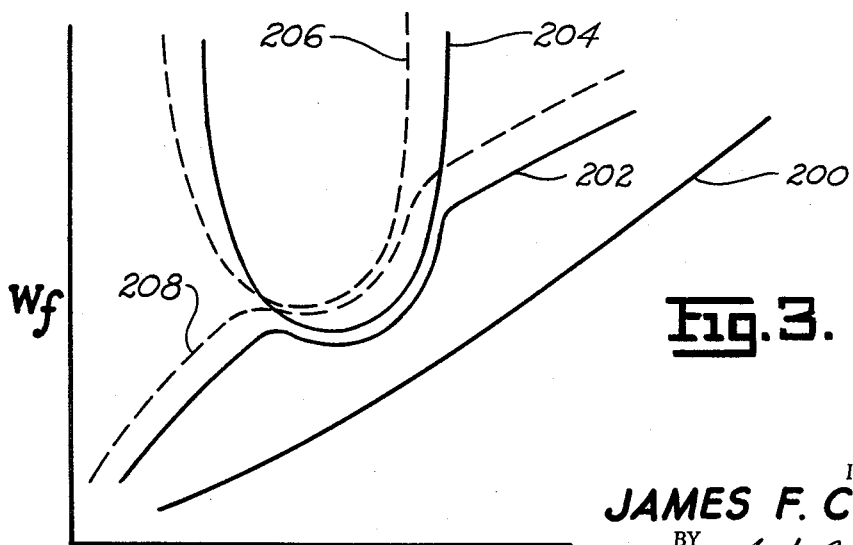
Figure 3 is a curve chart illustrating the operation of the control apparatus in accordance with the present invention.

In Figure 3 there is shown a curve chart showing the required to run fuel schedule curve 200. An acceleration fuel flow schedule curve 202 is shown for a first engine or compressor stall or unstable operation region as illustrated by the area within the curve 204. However in the operation of the control member 56 as shown in Figure 1 the engine compressor stall or unstable operation region may be shifted as illustrated by the curve 206, such that a different acceleration fuel flow schedule 208 may be desirable as illustrated by the curve 208.

Figure 4:
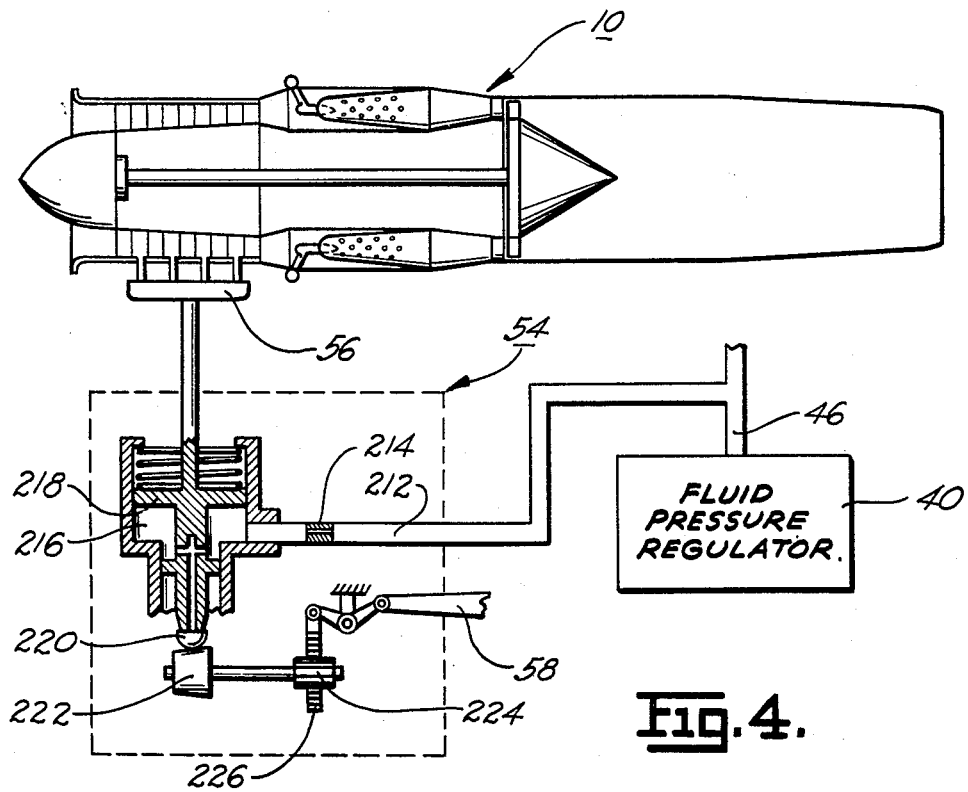
Figure 4 illustrates the operation of the engine operation control members shown in Figure 1.

In Figure 4 there is shown schematically the arrangement of the compressor operation control device 54. A fluid pressure regulator 40 supplies pressure regulated control fluid through a conduit 212 including a control bleed 214 to a fluid chamber 216 operative with a control piston 218 for controlling the position of the compressor bleed control member 56. A half-ball or flapper valve 220 is controlled in position by a control cam 222 for the purpose of determining the pressure of the control fluid within the fluid chamber 216. The cam 222 is controlled in position by a piston 224 and rack member 226 in accordance with a position of the control arm 58 as shown in Figure 1.

Figure 5:
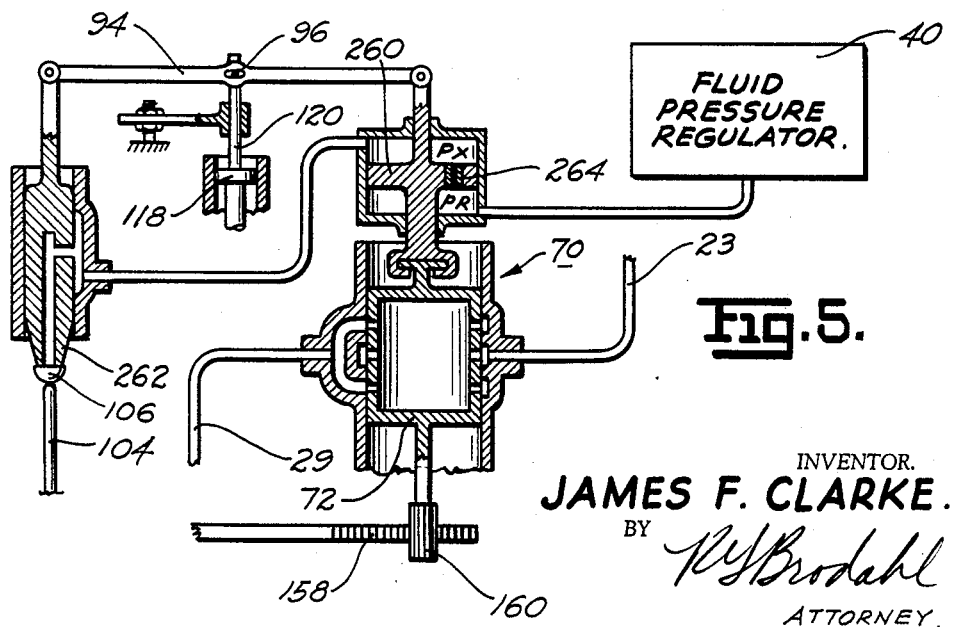
Figure 5 shows a modified form of the subject apparatus.

In Figure 5 there is shown a modification of the subject apparatus wherein the power piston 260 is directly connected to the metering valve member 72 for axially positioning said valve member 72 as a function of the position of half-ball valve 106. The valve seat member 262 is operative with the half-ball valve 106, and is connected to one end of the control arm 94 with the power piston 260 being connected to the other end of the control arm 94 as shown in Figure 5. The support connection or pivot 96 is positioned as previously described relative to Figure 2, as is the half-ball valve 106. It should be noted that the control fluid at regulated pressure $P_R$ is supplied to the smaller area side of the piston member 260, and the latter piston member 260 includes a control bleed member 264 leading to the larger area side of the piston member 260.

In the operation of the control apparatus in accordance with the present invention the acceleration fuel flow schedule is enrichened or derichened by varying the position of the support connection 96 shown in Figure 2 as a function of an engine operating parameter, for example engine speed as shown by the apparatus of Figure 2. This variation of the acceleration and fuel flow schedule is desirable due to the change in position of the compressor stall or unstable operating region as illustrated by the curve chart shown in Figure 3. Effectively the axial position of the valve member 72 of the control metering valve 70 is varied. The servo input signal utilized to vary the axial position of the valve member 72 is applied through a control cam 124 as a function of the engine operating parameter that is used to control the compressor control members or bleed member 56. In this respect as shown in Figure 4 engine speed is sensed and utilized in a manner as determined by the scheduling of cam member 222 to control the operation of the compressor bleed member 56.

Engine speed is utilized as shown in Figure 2 to control the position of the half-ball or flapper valve 134 which in turn determines the position of the control piston member 130 to rotate the control cam 124. The latter cam 124 determines the position of the half-ball valve 122 for positioning the control piston member 118 as a function of engine speed. Then as the fuel flow to the engine is controlled in accordance with the conventional scheduling of the manual control throttle 34 acting through the governor spring 110 by means of the output control force of the speed responsive flyweight member 98, the half-ball 106 is positioned to determine the axial position of the valve member 72 of the fuel metering valve 70. The acceleration cam 146 is operative to schedule the fuel flow during acceleration of the engine in the conventional manner by similarly positioning the half-ball valve 106 to control the axial position of the valve member 72.

In this respect the compressor control members 56 may bleed the first and/or the fifth and/or the seventh or various intermediate stages of the compressor 12, as may be desired, to shift the stall or unstable operation region of the compressor 12 and the gas turbine engine 10. If desired the control bleeds as well as the position of the support connection 96 may be controlled as a function of engine speed or as a function of temperature biased engine speed. However in this respect, if inlet temperature biased engine speed is utilized to control the position of the compressor bleed members 56, it appears desirable that this same temperature biased engine speed should also be utilized to control the position of the support connection 96.

Referring to the curve chart shown in Figure 3 the stall or unstable operating region as represented by the curve 204 may correspond to a closed compressor bleed operating condition and the stall or unstable operating region as illustrated by the curve 206 may correspond to an open compressor bleed member condition.

Although the present invention has been described with a certain degree of particularity it should be understood that the present disclosure has been made only by way of example, and that numerous changes in the details of construction and the combination and arrangement of parts may be resorted to without departing from the scope and spirit of the present invention.

I claim:

1. In fuel control apparatus for an engine operative with a fuel supply and having a characteristic range of unstable operation, said engine including an engine operation control member operative to shift said range of unstable operation, the combination of a fuel conduit adapted for connection between said fuel supply and said engine, a valve member operative with said conduit and movable for controlling the fuel flow through said conduit to said engine, a first engine speed responsive device operatively connected through a connection member to said valve member for controlling the opening of said valve member as a function of engine speed during acceleration of said engine, and a second engine speed responsive device operatively connected to said engine operation control member for shifting said range of unstable operation of said engine as a function of speed, with said second speed responsive device being operatively connected to said connection member to control the movement of said valve member relative to the shifting of said range of unstable operation.

2. In fuel control apparatus for an engine operative with a fuel supply and having an engine air flow control member, the combination of a fuel conduit adapted for connection between said fuel supply and said engine, a fuel flow control device operative with said conduit for controlling the fuel flow through said conduit to said engine, a first engine speed responsive device operatively connected to said fuel flow control device for controlling the flow of fuel to said engine as a function of engine speed, and a second engine speed responsive device operatively connected to said engine air flow control member for controlling the operation of said engine as a function of engine speed, with said second engine speed responsive device being operatively connected to said fuel flow control device for controlling as a function of engine speed the control of the flow of fuel to said engine by said first engine speed responsive device.

3. In fuel control apparatus for an engine operated with a fuel supply and including a compressor having a characteristic range of unstable operation, said engine including a plurality of compressor operation control members operative to shift said range of unstable operation, the combination of a fuel conduit adapted for connection between said fuel supply and said engine, a valve member operative with said conduit and movable for controlling the fuel flow through said conduit to said engine, a first engine speed responsive device operatively connected through a connection member to said valve member for controlling the movement of said valve member as a function of speed, a second engine speed responsive device operatively connected to at least one of said compressor operation control members for controlling the operation of said compressor as a function of engine speed, with said second speed responsive device being operatively connected to said connection member for modifying as a function of speed the control of fuel flow to said engine by said first engine speed responsive device.

4. In fuel control apparatus for an engine operated with a fuel supply and having a characteristic range of unstable operation, said engine including an engine operation control member operative to shift said range of unstable operation, the combination of a fuel conduit adapted for connection between said fuel supply and said engine, a valve member operative with said conduit for controlling the fuel flow through said conduit to said engine, a first engine speed responsive drive operatively connected through a connection member to said valve member for controlling the fuel flow to said engine as a function of engine speed, with said connection member being pivoted about a support member, and a second engine speed responsive device operatively connected to said engine operation control member for shifting said range of unstable operation as a function of engine speed, with said second engine speed responsive device being operatively connected to said support member for varying the position of said connection member as a function of engine speed.

5. In fuel control apparatus for an engine operated with a fuel supply, said engine including an engine control member for varying the operation of said engine, the combination of a fuel conduit adapted for connection between said fuel supply and said engine, a fuel flow control valve member operative with said conduit for controlling the fuel flow through said conduit to said engine, a first engine speed responsive device operatively connected to said valve member for controlling the acceleration fuel flow to said engine as a function of engine speed, a second engine speed responsive device operatively connected to said engine control member for varying the operation of said engine as a function of engine speed, with said second engine speed responsive device being operatively connected to said valve member for varying the fuel flow to said engine relative to the operation of said engine as determined by said engine control member.

6. In fuel control apparatus for an engine operative with a fuel supply, said engine including a compressor and having a compressor operation control member, the combination of a fuel conduit for supplying fuel from said fuel supply to said engine, a valve member operative with said conduit for controlling the fuel flow to said engine, a first engine speed responsive device operatively connected to said valve member for controlling the fuel flow to said engine as a function of engine speed, a second engine speed responsive device operatively connected to said compressor operation control member for controlling the operation of said compressor as a function of engine speed, with said second engine speed responsive device being operatively connected to said valve member for modifying as a function of engine speed the control of said valve member by said first engine speed responsive device.

7. In fuel control apparatus for an engine operative with a fuel supply, the combination of a fuel conduit adapted for supplying fuel from said fuel supply to said engine, a valve member operative with said conduit and movable for controlling the fuel flow through said conduit to said engine, a first fuel flow scheduling cam member operatively connected through a connection member to said valve member for providing a predetermined fuel flow schedule during an acceleration of said engine, a first engine speed responsive device operatively connected to said first cam member for positioning said first cam member as a function of speed, with said connection member being pivotally supported by a support member, and a second engine speed responsive device operatively connected to said support member for positioning said support member as a function of engine speed, with said second engine speed responsive device including a second fuel flow scheduling cam member for varying said predetermined fuel flow schedule.

References Cited in the file of this patent

UNITED STATES PATENTS

| | | |
|---|---|---|
| 2,720,751 | Kunz | Oct. 18, 1955 |
| 2,750,734 | Anxionnaz et al. | June 19, 1956 |

FOREIGN PATENTS

| | | |
|---|---|---|
| 694,083 | Great Britain | July 15, 1953 |